United States Patent [19]

Bindel et al.

[11] Patent Number: 4,500,100

[45] Date of Patent: Feb. 19, 1985

[54] CYLINDER HEAD GASKET

[75] Inventors: Rudolf Bindel, Grafenberg; Eugen Ruoff, Urach, both of Fed. Rep. of Germany

[73] Assignee: Elring Dichtungswerke GmbH, Fellbach, Fed. Rep. of Germany

[21] Appl. No.: 633,800

[22] Filed: Jul. 24, 1984

Related U.S. Application Data

[62] Division of Ser. No. 536,909, Sep. 28, 1983.

[30] Foreign Application Priority Data

Oct. 30, 1982 [DE] Fed. Rep. of Germany ....... 3240295

[51] Int. Cl.³ .......................... F16J 15/12; B65D 53/00
[52] U.S. Cl. ................................ 277/235 B; 277/234; 277/DIG. 6
[58] Field of Search ................................ 277/227–229, 277/233, 234, 235 B, 235 R, 235 A, DIG. 6

[56] References Cited

U.S. PATENT DOCUMENTS

| 2,211,045 | 8/1940 | Balfe | 277/235 B X |
| 2,828,988 | 4/1958 | Gorsica et al. | 277/235 B |
| 2,943,010 | 6/1960 | Stefl et al. | 154/127 |
| 4,169,185 | 9/1979 | Bhatia | 277/235 B X |

FOREIGN PATENT DOCUMENTS

| 167979 | 7/1956 | Australia | 277/DIG. 6 |
| 1230564 | 12/1966 | Fed. Rep. of Germany . | |
| 1255924 | 12/1967 | Fed. Rep. of Germany . | |
| 7303470 | 6/1973 | Fed. Rep. of Germany . | |
| 2816459 | 10/1979 | Fed. Rep. of Germany . | |
| 3042912 | 6/1982 | Fed. Rep. of Germany . | |
| 2053829 | 4/1971 | France | 277/235 B |
| 53-99255 | 8/1978 | Japan | 277/DIG. 6 |
| 55-17261 | 5/1980 | Japan | 277/DIG. 6 |

Primary Examiner—Robert S. Ward
Attorney, Agent, or Firm—Collard, Roe & Galgano

[57] ABSTRACT

A cylinder head gasket having at least one plate of soft material and at least one combustion chamber opening, said soft material including predominantly inorganic fibers and/or filling materials connected by binding means and including free OH groups, the soft material is mixed with a first impregnating material comprising a polysiloxane containing reactive hydrogen groups for reaction with the free OH groups of the fibers or filling materials and a second impregnating material which consists of a second polysiloxane of a higher degree of polymerization than the first polysiloxane and which polymerizes with itself as well as with the reactive hydrogen groups of the first polysiloxane, said second polysiloxane forming a stable siloxane structure having more branches than the first polysiloxane.

20 Claims, 1 Drawing Figure

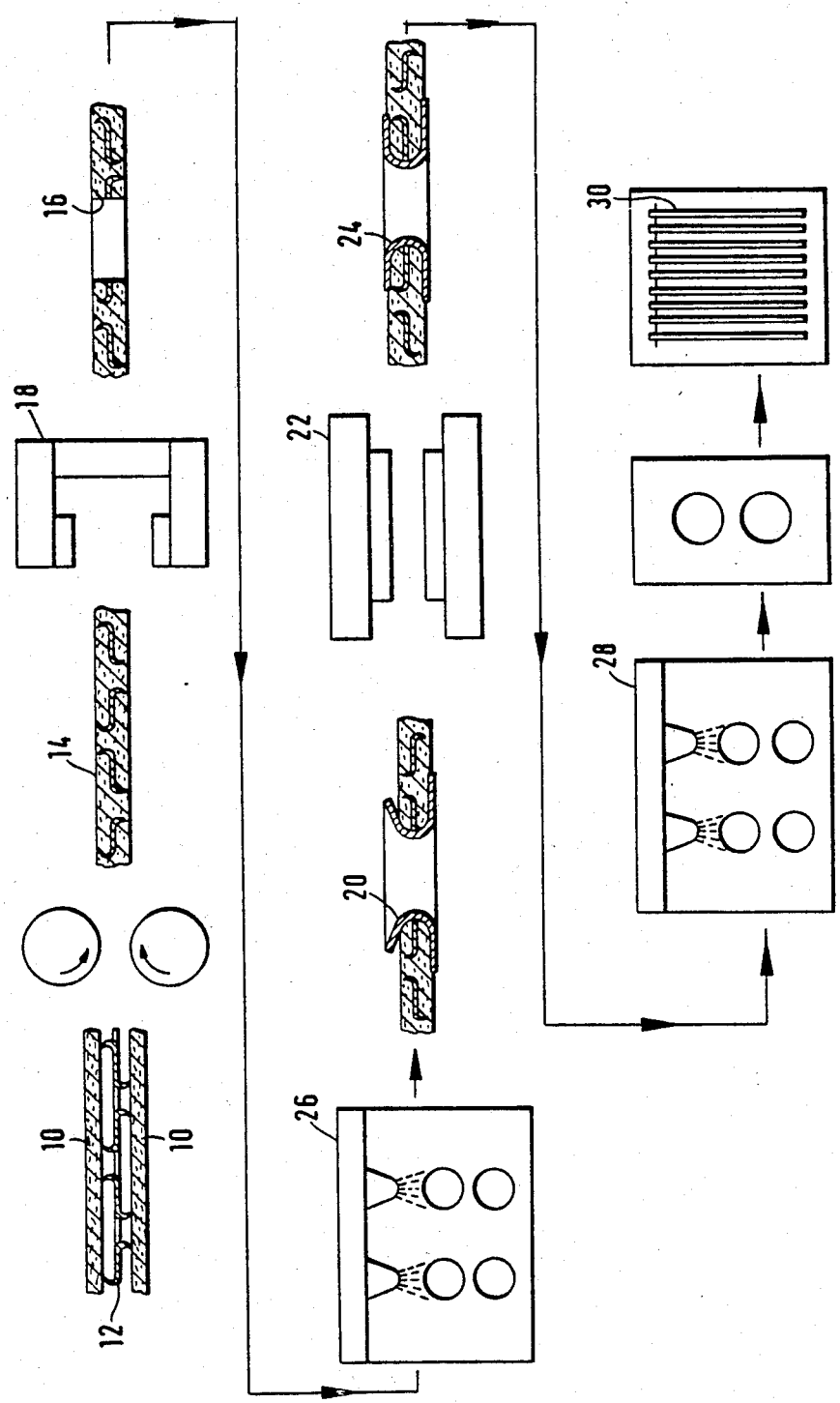

CYLINDER HEAD GASKET

This application is a division of application Ser. No. 536,909, filed Sept. 28, 1983.

The present invention relates to a gasket, more particularly it relates to a cylinder head gasket, and a method for manufacturing such a gasket.

In the conventional manner of manufacturing cylinder head gaskets, plates of soft material of asbestos fibers combined with synthetic rubber are rolled on both sides of a carrier metal sheet. The plates of soft material are then impregnated with polymer impregnating means for improvement of their durability with respect to cooling and lubricating and, also, to provide a seal along their cross-sections after the openings to the combustion chamber have been provided with metallic rim borders. Furthermore, the surfaces of the cylinder head gasket are provided with a coating layer so as to improve the microseal on the sealing surfaces and to eliminate the natural tendency of asbestos to adhere to the respective opposite metallic surfaces of the cylinder head and the engine block.

The manufacture of such known cylinder head gaskets is not only relatively expensive, but it leads in some situations to objectionable results. Most known impregnating means have undesirable features relating to the durability of the soft material. Therefore, with respect to any durable gas seal below the rim borders surrounding the combustion chamber openings, complicated measures are resorted to in order to prevent as much as possible penetration of the impregnating means below the border rims. The surface coating which serves to microseal the gasket surfaces not only requires an additional manufacturing step, but also results in groove-like traces of wear on the metallic rim borders. Since, during operation of an engine, the cylinder head and the engine block execute relative movements with respect to one another in the sealing plane, a surface coating having grooves extending on the rim borders parallel to the sealing plane results in the gas seal being impaired along the combustion chamber openings.

It is, therefore, a primary object of the present invention to devise a gasket which, compared to the aforedescribed known cylinder head gasket, can be manufactured more simply and nevertheless have a greater durability or stability. According to the present invention, two successively used impregnating means are proposed. At least the first used impregnating means or material is beneficial, as a result of a substantially higher temperature consistency, below the metallic rim borders of the combustion chamber openings. Also, it further improves the stability or durability thereat. The impregnating material eliminates the natural tendency of asbestos to adhere to the respective opposite metallic surfaces of the cylinder head and engine block, and it also improves the microseal of the gasket surface to such an extent that any additional surface coating can be dispensed with. By reaction of the first impregnating material with free OH groups contained in the inorganic fibers and/or filling materials, preferably asbestos fibers, which substantially makes up the plate of soft material, there results pronounced hydrophobic and anti-adhesive properties of the plate of soft material. The second impregnating material polymerizes with the reactive groups of the first impregnating material so that a composite action is obtained. This imparts to the gasket optimum properties with respect to temperature consistency under dynamic stress, sealing property of the cross-section, elastic behavior, setting property and consistency in relation to cooling means and lubricating oil, as well as with respect to anti-adhesive surface properties. Also, the inventive system for impregnating means results in sliding properties on the surfaces of the gasket. This prevents absorption in the sealing plane by the cylinder head gasket of the movement arising during engine operation of the cylinder head relative to the engine block.

The inventive gasket, therefore, is characterized by the omission of the hitherto used surface coating for microsealing the gasket surfaces.

In the case of a cylinder head gasket, whose combustion chamber opening or openings include a metallic border rim or rims, any excess impregnating materials are removed prior to polymerization, for example they are simply wiped off. Thus, the surface region of the rim border or borders extending approximately parallel to the sealing plane are at least largely metallically smooth, and consequently the aforedescribed grooves cannot arise during operation.

It is recommended that the impregnating material used initially be a polysiloxane having a molecular weight between about 2,000 and 4,500, particularly between about 3,000 and 3,500, and preferably be a methyl hydrogen polysiloxane with such a molecular weight. This impregnating material has a particularly pronounced tendency to chemically react with the free OH groups of the asbestos fibers or the like. Furthermore, the aforedescribed material groups have a relatively low viscosity, so that use of solvents mean for causing such impregnating materials to penetrate into the plate of soft material can be dispensed with. Therefore, the disadvantages caused by solvents—which must be expelled and which thereby leave micropores—can be avoided. Also, other suitable substances, such as Si-H groups, including silicon oil, can be used as a first impregnating means or material.

The first impregnating means can be applied or introduced into the plate of soft material by known methods, such as dipping, rolling, or spraying, and it has been found that from 2 to 15% by weight of impregnating material relative to the plate of soft material, is generally sufficient. The first impregnating means is preferably coated in such a manner that it can be introduced in the region of the cut edges of the plate of soft material both from above and from the side of the plate of soft material. Thus, the plate of soft material includes, in the region of its cut edges, a substantially higher proportion of the first impregnating material than in its remaining regions. This enrichment of the first impregnating material in the region of the cut edges can be up to 80% greater than in the other regions of the plate of soft material. As a result of this enrichment of the first impregnating means in the region of the cut edges, the sealing property in a cross-sectional direction of the combustion chamber opening is substantially improved, for example with respect to cooling means and lubricating means.

A heat treatment for polymerizing of the first impregnating material is generally dispensed with, according to the present invention, so that following the application of the second impregnating material, the first impregnating material can still undergo a chemical reaction therewith.

The second impregnating means to be used preferably contains a mixture of two-dimensional and three-dimensional polymerizing polyorganosiloxane resins, which have a particularly pronounced tendency to also polymerize with the reactive groups of the first impregnating means. It has been found that from 2 to 15% by weight of the second impregnating material relative to the plate of soft material is generally sufficient.

It is also advantageous if the second impregnating means contains a small portion of non-reactive silicon oil as a softener and as anti-adhesion means. This silicon oil partially seeps out during any subsequent heating of the cylinder head gasket, and particularly intensively opposes the adhesion of the gasket to any opposite metallic surface.

For accelerating the hardening of the second polysiloxane, it is advisable to use catalysts such as tin salts, aluminum salts, lead salts, or organic titanate salts. Preferably, between 3 to 22% of such catalyst by weight of the solid resin should be used.

In a preferred method for manufacturing the gasket of the present invention, the plate of soft material mixed with the binding means and formed with a combustion chamber opening or openings, is first impregnated with the first impregnating means, and is then, without any immediately subsequent heat treatment, impregnated with the second impregnating means. Only then is the plate of soft material subjected to a heat treatment for polymerizing of the polysiloxane. In the case of a cylinder head gasket, the combustion chamber openings can be provided with metallic rim borders between the application of the two impregnating means, as the first impregnating means does not break down below these rim borders in view of its high temperature consistency.

Advantageously, the plate of soft material, after being impregnated with the first impregnating means, is compressed by means of pressure, whereby the still deformable first impregnating means is pressed into all available recesses which may be hollow spaces optionally provided. Simultaneously, there results such a high compression of the soft material below the metallic rim borders that no amount, or only very small amounts, of the second impregnating means subsequently applied penetrates the soft material below the border rims.

Excess amounts of the second impregnating means are mechanically removed prior to heat treatment, preferably by squeezing roller, and subsequent wiping off of the gasket with paper. In this way the border rims are metallically clean, and no measurable layer of the second impregnating means remains on the fibers or filling materials lying on the two main surfaces of the gasket.

The second impregnating material is preferably used together with a solvent wherein toluol and xylol are preferred solvents. The range for said solvent is about 20 to 40% by weight of said second impregnating material and preferably 30% is optimal.

Finally, following expulsion of the solvent means from the second impregnating means, the gasket is heat-treated for hardening of the polysiloxane. This heat treatment preferably is of a duration of about one quarter of an hour at a temperature of about 150° C. to 180° C. and preferably 160° C.

Both impregnating means can be supplied from the company Rhône-Poulence GmbH, Gutleutstrasse 60, D-6000 Frankfurt, namely, for the second impregnation, for example, the product "Resine 21317" or "Resine 21320" can be utilized.

By means of the enclosed drawing, manufacture of the cylinder head gasket according to the present invention is further explained.

The drawing shows a schematic line diagram of the process of manufacturing a cylinder head gasket according to the present invention.

First, the two plates of soft material 10 are rolled upon a sheet metal carrier 12 provided with anchoring tongues. From the sealing plate 14 resulting therefrom, openings, such as a through-going opening 16 to the combustion chamber, are stamped out by means of a punch 18. Then the first impregnating means is applied to both sides of the gaskets by means of a spray arrangement 26. Then a sheet metal ring 20 is inserted into the combustion chamber opening 16, which is reshaped by means of a press 22 into a combustion-chamber border-rim 24. Finally, the second impregnating means is applied by means of a further spray arrangement 28. So as to avoid the appearance of any surface coating, excessive impregnating material is removed from the surfaces of the gasket and of the border rim 24, for example by means of felt rollers, by wiping off with absorbent paper and the like, before the impregnating means are hardened by a heating arrangement 30.

It is to be understood that the foregoing general and detailed descriptions are explanatory of the present invention and are not to be interpreted as restrictive of the scope of the following claims.

What is claimed is:

1. A cylinder head gasket having at least one plate of soft material and at least one combustion chamber opening:
   said plate of soft material consisting predominantly of inorganic fibers connected by binding means and including free OH groups, wherein part of the fibers or filling materials extend up to the surface of the plate of soft material, said plate of soft material being mixed with polymer impregnation means;
   said polymer impregnation means including a first impregnating material application of a first polysiloxane containing reactive hydrogen groups for reaction with the free OH groups of the fibers and filling materials and a second impregnating material application of a second polysiloxane of a higher degree of polymerization which polymerizes with itself as well as with the reactive hydrogen groups of the polysiloxane of the first impregnating material, the second polysiloxane forming a stable siloxane structure having mre branches than the first polysiloxane.

2. The gasket as defined in claim 1, wherein said plate of soft material includes filling materials in addition to said inorganic fibers.

3. The gasket as defined in claim 1, wherein said plate of soft material consists predominantly of filling materials.

4. The gasket as defined in claim 1, wherein the inorganic fibers connected by binding means are asbestos fibers.

5. The gasket as defined in claim 1, wherein the combustion chamber opening includes a metallic rim border and wherein the surface regions of said rim border, which are approximately parallel to the sealing plane, are at least substantially metal-smooth.

6. The gasket as defined in claim 1, wherein the first polysiloxane has a molecular weight between 2,000 and 4,500.

7. The gasket as defined in claim 1, wherein the first polysiloxane has a molecular weight between 3,000 and 3,500.

8. The gasket as defined in claim 1, wherein the first polysiloxane is a methylhydrogen polysiloxane.

9. The gasket as defined in claim 1, wherein said first polysiloxane is a silicon oil including silicon-hydrogen groups.

10. The gasket as defined in claim 1, wherein said plate of soft material comprises between 2% and 15% by weight of said first polysiloxane.

11. The gasket as defined in claim 1, wherein said plate of soft material comprises between 2% and 15% by weight of said second polysiloxane.

12. The gasket as defined in claim 1, wherein said plate of soft material has cut edges having a substantially higher proportion of said first polysiloxane than the remaining regions of said plate of soft material.

13. The gasket as defined in claim 1, wherein said second impregnating means includes a mixture of polyorganosiloxane resins, polymerizing in two and three dimensions.

14. The gasket as defined in claim 1, wherein said second impregnating means includes as a softener and anti-adhesion means a small amount of non-reactive silicon oil.

15. The gasket as defined in claim 1, wherein said second impregnating means includes a catalyst as a hardening accelerator for said second polysiloxane.

16. The gasket as defined in claim 15, wherein said catalyst includes a tin salt.

17. The gasket as defined in claim 15, wherein said catalyst includes an aluminum salt.

18. The gasket as defined in claim 15, wherein said catalyst includes a lead salt.

19. The gasket as defined in claim 15, wherein said catalyst includes an organic titanate salt.

20. The gasket as defined in claim 15, wherein said second impregnating means contains 3% to 22% of a catalyst by weight of the solid resin.

* * * * *